July 27, 1948.
E. W. FEHLBERG
2,446,083
VEHICLE SIDE DRAFT HITCH
Filed Nov. 16, 1945
3 Sheets-Sheet 1
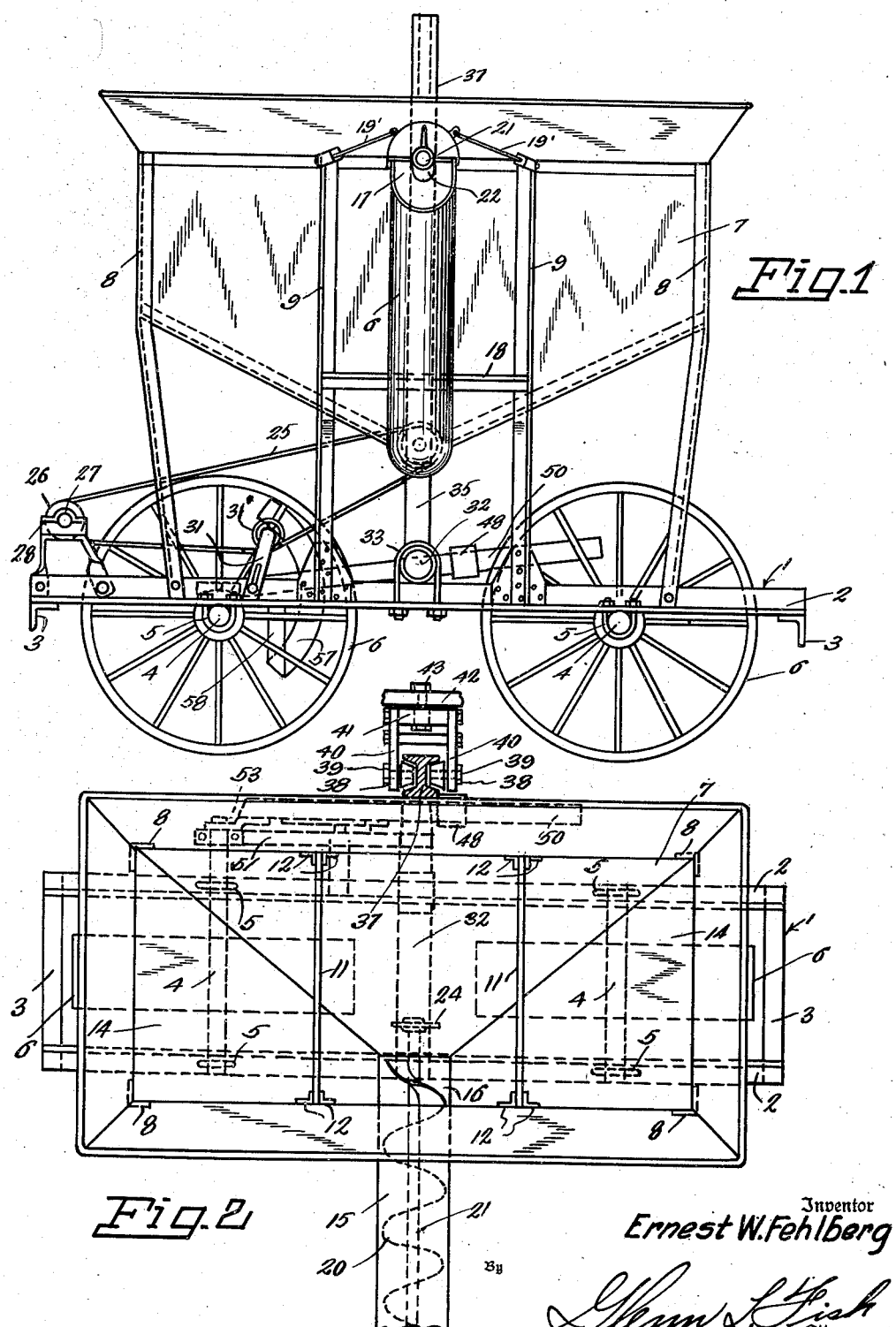
Inventor
Ernest W. Fehlberg
By
Glenn L. Fish
Attorney INVENTOR
Ernest W. Fehlberg
BY Glenn L. Fish
ATTORNEY

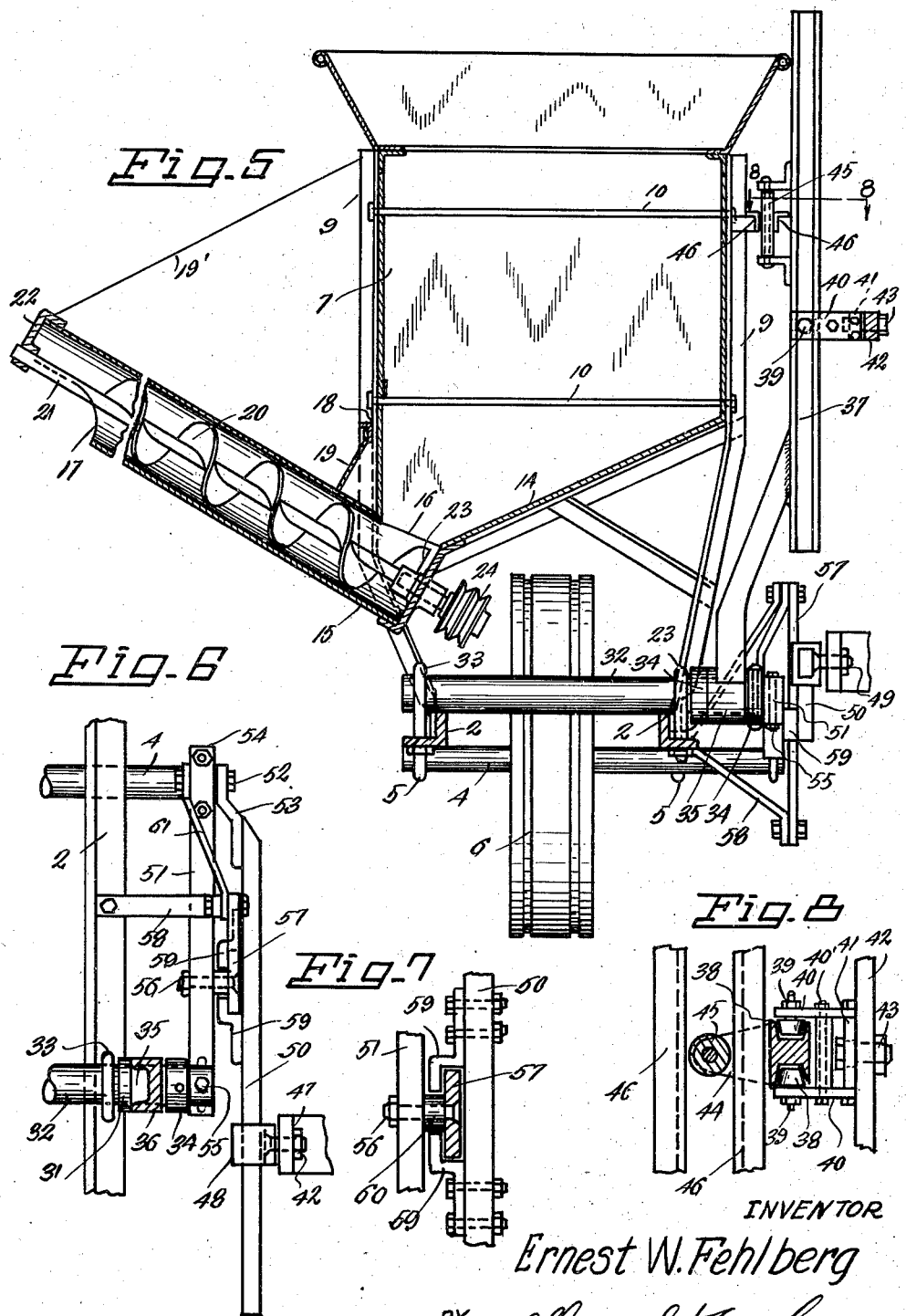

Patented July 27, 1948

2,446,083

UNITED STATES PATENT OFFICE 2,446,083

VEHICLE SIDE DRAFT HITCH

Ernest W. Fehlberg, Walla Walla, Wash.

Application November 16, 1945, Serial No. 629,060

5 Claims. (Cl. 280—33.44)

This invention relates to a grain receptacle and it is one object of the invention to provide a grain receptacle equipped with wheels and constituting an attachment for a combine used for harvesting grain and holding threshed grain which is transferred from the receptacle to a truck or other vehicle by means of which the grain is transported to a barn or other place of storage.

At the present time it is customary to have a combine accompanied by a truck or other suitable farm wagon to receive grain from the combine but when the wagon has been filled it is necessary to discontinue operation of the combine while the wagon is to be emptied at a barn and returned to the combine. This causes loss of time and it is therefore another object of the invention to provide a receptacle having a delivery spout in which is mounted a screw conveyor driven from a drive shaft and adapted to be shut off when a wagon has been filled with grain and thus allow grain to accumulate in the receptacle while the wagon is being emptied and returned to the combine or another wagon or truck driven into position to receive grain delivered from the receptacle through its discharge spout.

Another object of the invention is to provide a receptacle having a grain-receiving hopper supported over a carriage in such manner that it will be firmly supported, the hopper having a sloping bottom leading to an opening through which grain flows into the lower portion of the spout through which grain is discharged from the hopper into the wagon.

Another object of the invention is to provide a grain receptacle adapted to be mounted at a side of a combine in such manner that it may follow uneven ground without danger of turning over or causing grain to be spilled from the hopper of the receptacle by jolting.

Another object of the invention is to provide a receptacle of such dimensions that while it will hold a large quantity of grain it will not project transversely from a harvester a sufficient distance to be in the way and interfere with efficient use of the harvester.

The invention is illustrated in the accompanying drawings wherein:

Fig. 1 is a side elevation looking at the outer side of the receptacle.

Fig. 2 is a top plan view of the receptacle.

Fig. 5 is a transverse sectional view taken vertically through the receptacle.

Fig. 6 is a fragmentary view showing the mechanism for connecting the receptacle with the harvester in top plan.

Fig. 7 is a fragmentary view partially in top plan and partially in section.

Fig. 8 is a fragmentary sectional view taken along the line 8—8 of Figure 5.

Figure 3:
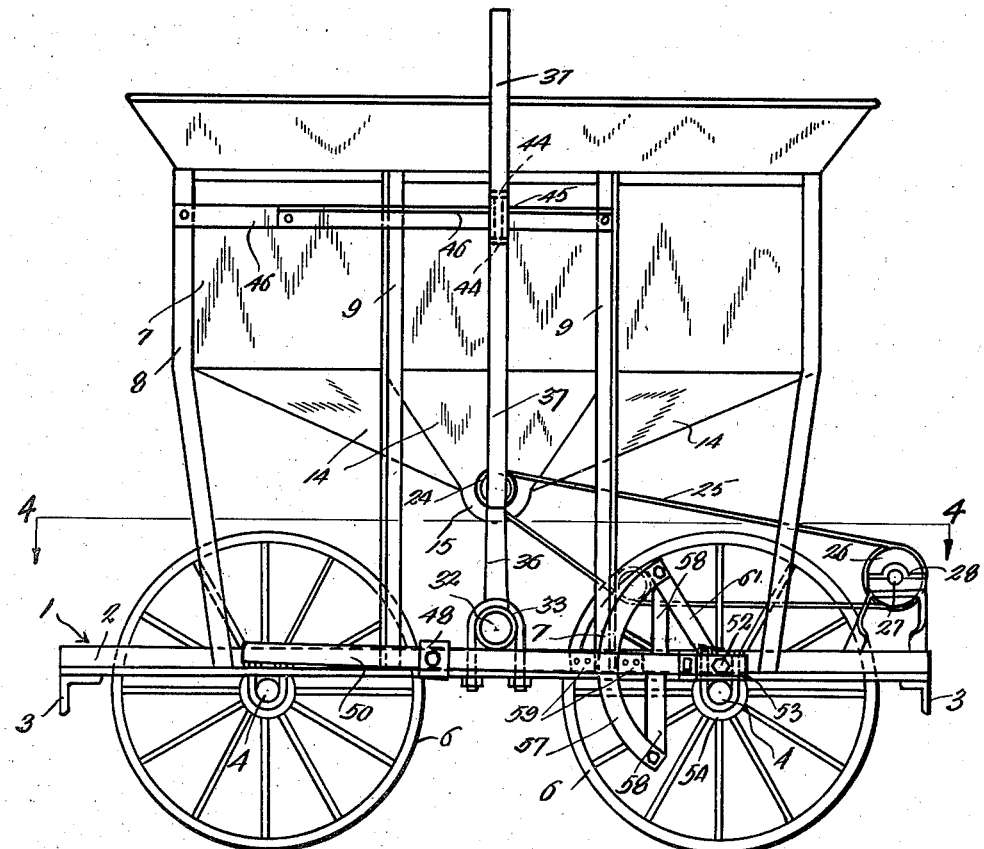
Fig. 3 is a side elevation looking at the inner side of the receptacle.
Figure 4:
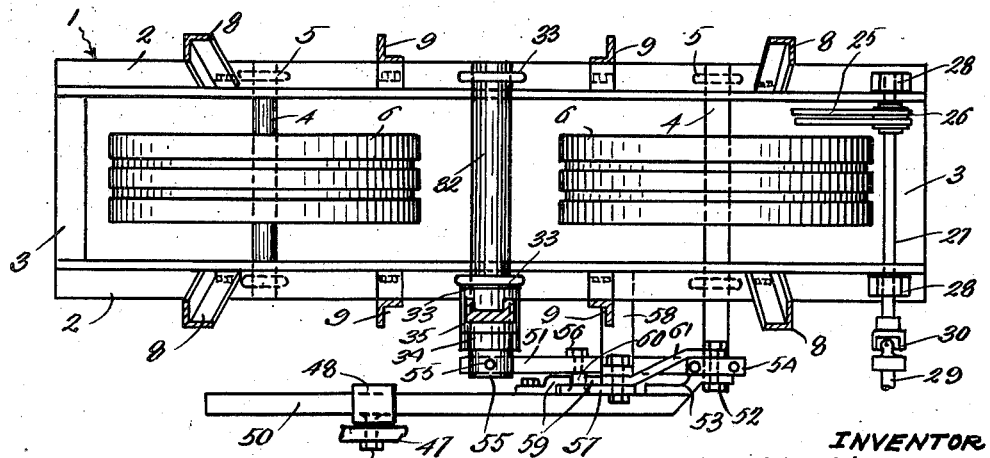
Fig. 4 is a sectional view taken along the line 4—4 of Figure 3.

This receptacle is intended to receive grain from a harvester of the type known as a combine and having mechanism for threshing grain as well as cutting the growing grain. The receptacle, which may be called a "bulker" as it receives loose grain from the harvester, has a carriage 1 formed of bars of angle metal and having side bars 2 and end bars 3 welded or otherwise secured to ends of the side bars. Axles 4 are mounted under the side bars transversely thereof by U-bolts 5 and these axles carry wheels 6 which rest upon the ground. The width of the carriage is such that only a single front wheel and a single rear wheel are necessary. The wheels are wide, as shown in Figures 3 and 5, and therefore they will support the receptacle in an upright position and prevent it from tilting transversely.

A hopper 7 formed of sheet metal is disposed over the frame or carriage 1 and this hopper is supported by corner posts or bars 8 and intermediate bars 9 formed from bars of angle metal and having their lower ends welded or riveted to the side bars of the frame 1. Rods 10 brace the hopper against outward bulging strains and in order to prevent grain from surging longitudinally in the hopper and spilling from the open upper end thereof when the receptacle is traveling over rough ground there have been provided splash boards 11 mounted vertically in the hopper transversely thereof and having side edge portions engaged in tracks formed by vertically extending strips of angle metal 12 carried by side walls of the hopper. Lower ends of the splash boards are spaced upwardly from the bottom 14 of the hopper so that grain in the hopper may flow along the downwardly sloping portion of the bottom and into a tubular spout 15 through an opening 16. The spout 16 extends outwardly from the outer side of the hopper at an upward incline, as shown in Figure 5, and the under portion of its upper end is formed with a discharge opening 17 through which grain is discharged into a truck or other vehicle which is driven across a field with the harvester at the outer side of the receptacle. A cross bar 18 is carried by the bars 9 at the outer side of the hopper and to this bar is attached the upper end of a brace 19 for supporting the spout in its inclined position.

The upper end of the spout is braced by guy wires 19'.

Within the spout is mounted a screw conveyor 20 having its shaft 21 mounted in bearings 22 and 23 at ends of the spout and the inner or lower end of the shaft projects from the lower end of the spout and carries a pulley 24 about which is trained a belt 25. This belt is also trained about a pulley 26 carried by a shaft 27 extending transversely of the frame 1 and rotatably mounted in bearings 28. The inner end portion of shaft 27 projects from the frame and is connected with a power takeoff shaft 29 of the harvester by a universal joint 30. Therefore when the harvester is in motion power will be delivered to shaft 27 and rotary motion transmitted by the belt 25 to the conveyor 20. A belt-tightener 31 is pivoted to one side bar 2 and has its roller or pulley 31' engaged with the lower flight of the belt and tightens the belt to such an extent that movement of the belt will rotate the pulley 24 and operate the conveyor.

A tubular shaft or pipe 32 is mounted transversely of the frame 1 upon its side bars 2 by U-bolts 33 and this shaft projects from the inner side of the frame and carries collars 34 between which is a sleeve 35. A bracket 36 extends upwardly from the sleeve and has its upper portion extending at an outward incline and welded to the lower portion of a bar 37. The bar extends vertically and is of H-shaped cross section to provide side grooves in which are engaged rollers 38 rotatably supported by bolts or pins 39 carried by brackets 40 braced by a spacer 40' and projecting from opposite sides of a block 41 which is pivoted to a bar 42 by a bolt 43. The bar 42 extends horizontally at a side of the harvester and is mounted upon the harvester in any desired manner. The upper portion of the bar 37 carries brackets 44 between which a vertically disposed roller 45 is rotatably mounted and this roller engages between horizontally extending bars 46 carried by the hopper in spaced parallel relation to each other. Since the roller 45 extends between the bars 46 the receptacle may have vertical movement relative to the harvester but it will be maintained in an upright position and prevented from tilting transversely. It may, however, have tilting movement forwardly and rearwardly as its wheels 6 pass over rough ground during movement of the harvester across a field.

In order to control longitudinal rocking movement of the receptacle while traveling over rough ground it is connected with a bar 47 rigid with the harvester by mechanism shown in Figures 3 through 7. The bar 47 carries a sleeve 48 which is pivoted to it by a bolt 49 and through this sleeve slidably passes a bar 50 which extends longitudinally of the receptacle and has its rear end pivoted to the rear end of a bar or arm 51 by a bolt 52 passing through a bracket 53 at the end of the bar. The arm 51 extends longitudinally of the receptacle and has its rear end secured to the rear axle by a U-bolt 54 and its front end secured to the shaft 32 by a bolt 55. A bolt 56 connects the arm 51 with a quadrant 57 and this quadrant is disposed vertically and connected with the adjacent side bar 2 of the frame by bracing strips 58. Brackets 59 carried by the bar 50 overlap the quadrant from the opposite side edges thereof, and hold the quadrant and the bar 50 in operative relation to each other. The ends of the brackets 59 are spaced from each other so that a spacer 60 through which the bolt 56 passes may move between the ends of the brackets during tilting movement of the bar 50. A strip 61 extends diagonally between the upper end of the quadrant and the front end of bar 51 and is pivotally mounted by the bolts connecting the quadrant with the upper strip 58 and the bracket 53 with the front end of the bar 51. The fact that the bar 50 can slide through the pivoted sleeve 48 and the quadrant move vertically allows the receptacle to have tilting movement longitudinally but this movement will be a smooth rocking movement instead of a jolty movement and the grain will not be caused to surge violently in the hopper.

When the device is in use and connected with a harvester it moves across a field with the harvester at a side thereof and grain is discharged from the harvester into the hopper. A wagon or truck accompanies the harvester and is so located that the spout 15 overhangs the body of the truck or wagon. Therefore grain which enters the lower end of the spout through opening 16 will be carried upwardly by the screw conveyor 20 and discharged through opening 17 into the truck or wagon. When the wagon or truck is filled rotation of shaft 27 is stopped or a clutch may be provided for freeing the pulley 26 from the shaft 27 and rotation of the conveyor 20 will be stopped. The loaded truck or wagon may then be driven to a barn and emptied and then returned to its position under the spout. Since the operation of the conveyor has been stopped grain discharged into the hopper from the harvester during absence of the truck will accumulate in the hopper and when the conveyor is again started the grain will be moved through the spout and discharged therefrom into the truck. It will thus be seen that operation of the harvester may be continued during absence of the truck instead of being stopped in order to prevent loss of grain which flows from the spout during movement of the harvester.

Having thus described the invention, what is claimed is:

1. A portable receptacle for receiving grain from a combined harvester and thresher comprising a carriage having a frame, front and rear axles mounted across said frame, wheels carried by said axles, posts mounted vertically at opposite sides of said frame, spaced cross bars carried by posts at the inner side of said frame and extending longitudinally of the frame, a bar mounted vertically in spaced relation to the inner side of said frame, brackets carried by the vertical bar, a roller mounted vertically between said brackets and engaged between the cross bars, a bar for extending longitudinally of a harvester, a block pivoted to the last mentioned bar, brackets projecting outwardly from opposite side edges of said block and overlapping opposite sides of the vertical bar, and rollers carried by the last mentioned brackets and engaged in grooves formed along sides of the vertical bar.

2. A portable receptacle for receiving grain from a combined harvester and thresher comprising a carriage having a frame, front and rear axles mounted across said frame, wheels carried by said axles, a shaft mounted across said frame, a sleeve about said shaft, an arm extending upwardly from said sleeve outwardly from the inner side of the frame, a vertical bar extending upwardly from the upper end of said arm and having grooves along opposite side faces, a track mounted horizontally of the inner side of said frame, brackets projecting from the vertical bar above and below the track, a vertical roller carried by the brackets and engaged with the track for vertical sliding movement and for movement longitudinally of the frame, a pivoted member adapted to be mounted at a side of a harvester, brackets projecting from opposite sides of the pivoted member, and rollers carried by the brackets of the pivoted member and engaged in the grooves of the vertical bar.

3. A portable receptacle for receiving grain from a combined harvester and thresher comprising a carriage having a frame, front and rear axles mounted across said frame, wheels carried by said axles, a shaft mounted across said frame, a vertical bar mounted from said shaft, a track mounted horizontally at the inner side of frame, a vertical roller carried by said bar and engaged with the track for movement vertically and horizontally, a member adapted to be pivotally mounted at a side of the harvester and having outwardly projecting brackets carrying rollers engaging opposite side faces of the vertical bar, a sleeve adapted to be pivotally mounted at a side of the harvester, a bar extending longitudinally of the receptacle and slidably mounted through said sleeve, a short bar extending longitudinally of the receptacle and having its rear end secured to the rear axle and its front end secured to said shaft, the first bar having its rear end pivoted to the rear end of the short bar, a quadrant disposed vertically and supported by strips secured to upper and lower ends of the quadrant and to the frame, a strip extending diagonally between the upper end of the quadrant and the rear end of the short bar, and brackets carried by the long bar and overlapping the quadrant from opposite side edges thereof.

4. A portable receptacle for receiving bulk grain from a harvester comprising a frame having front and rear axles extending transversely thereof and wheels carried by the axles, a shaft mounted across said frame, means for preventing transverse tilting of said receptacle adapted to be pivotally mounted at a side of a harvester, and means for controlling longitudinal tilting of the receptacle as its wheels move along rough ground, the means for controlling longitudinal tilting including a bar extending longitudinally of the frame and secured at its ends to the shaft and the rear axle, a sleeve adapted to be pivotally mounted at a side of the harvester, a bar slidably passing through said sleeve and having its rear end pivoted to the rear end of the first bar, a quadrant disposed vertically and supported from the frame, and brackets carried by the second bar and overlapping the quadrant from opposite side edges thereof.

5. A portable receptacle for receiving bulk grain from a harvester, comprising a frame having front and rear axles extending transversely thereof and wheels carried by the axles, a shaft mounted across said frame, a track extending longitudinally of the frame, mechanism pivoted to said shaft and slidably engaged with said track to prevent transverse tilting of the receptacle, a guide for controlling movement of said mechanism adapted to be pivotally connected with the harvester and slidably engaged with a vertically extending member of the said mechanism, and mechanism for controlling longitudinal tilting of the receptacle in a vertical direction as the wheels move over rough ground including a bar mounted between the shaft and the rear axle, a second bar spaced transversely from the first bar and pivoted at its rear end to the rear end of the first bar, a bearing adapted to be pivotally mounted at a side of the harvester and slidably receiving the second bar, a vertically disposed quadrant, and guides carried by the second bar and overlapping the quadrant from opposite side edges thereof.

ERNEST W. FEHLBERG.

REFERENCES CITED

The following references are of record in the file of this patent:

UNITED STATES PATENTS

| Number | Name | Date |
| --- | --- | --- |
| 1,291,813 | Engelhardt | Jan. 21, 1919 |
| 1,398,649 | Richards | Nov. 29, 1921 |
| 1,555,760 | Roy | Sept. 29, 1925 |
| 1,690,794 | Reschke | Nov. 6, 1928 |
| 2,022,166 | Welty | Nov. 26, 1935 |
| 2,124,149 | Redhead | July 19, 1938 |
| 2,234,629 | Freeman | Mar. 11, 1941 |
| 2,296,014 | Benzel | Sept. 15, 1942 |